United States Patent
McIntosh

(10) Patent No.: US 8,336,936 B2
(45) Date of Patent: Dec. 25, 2012

(54) MANUAL TRENCH TOOL

(76) Inventor: Calvin McIntosh, Regina (CA)

(*) Notice: Subject to any disclaimer, the term of this patent is extended or adjusted under 35 U.S.C. 154(b) by 0 days.

(21) Appl. No.: 11/052,511

(22) Filed: Feb. 8, 2005

(65) Prior Publication Data
US 2006/0185862 A1 Aug. 24, 2006

(51) Int. Cl.
*A01B 1/00* (2006.01)

(52) U.S. Cl. .................................................. 294/50.8

(58) Field of Classification Search ............. 172/13–18, 172/371–380; 294/50.8, 50.9, 49, 118, 50.6, 294/50.7; 175/396
See application file for complete search history.

(56) References Cited

U.S. PATENT DOCUMENTS

| | | | | |
|---|---|---|---|---|
| 281,137 A * | 7/1883 | Rhodes | 294/50.8 |
| 293,652 A * | 2/1884 | Gross | 111/101 |
| 429,903 A * | 6/1890 | Gregg | 294/50.8 |
| 437,466 A * | 9/1890 | Vogel | 294/50.8 |
| 594,305 A * | 11/1897 | Wight | 111/106 |
| 944,552 A * | 12/1909 | Hefner | 294/50.8 |
| 960,113 A * | 5/1910 | Rumble | 111/101 |
| 974,077 A * | 10/1910 | Kleeberger | 111/106 |
| 1,007,241 A * | 10/1911 | Schlatter | 111/92 |
| 1,051,029 A * | 1/1913 | Stephanus | 294/11 |
| 1,053,730 A * | 2/1913 | Jensen | 111/106 |
| 1,077,822 A * | 11/1913 | Engleman | 111/92 |
| 1,168,405 A * | 1/1916 | McDonald | 294/50.8 |
| 1,222,711 A * | 4/1917 | Amstrong | 294/50.8 |
| 1,761,503 A * | 6/1930 | Tonhardt | 294/50.8 |
| 1,888,929 A * | 11/1932 | McDowell | 294/50.8 |
| 2,149,880 A * | 3/1939 | Boordsen | 111/92 |
| 2,216,720 A * | 10/1940 | Cousins | 111/108 |
| 2,735,712 A * | 2/1956 | Hart | 294/50.5 |
| 2,891,813 A * | 6/1959 | Inaki | 294/50.6 |
| 3,749,034 A * | 7/1973 | Bergius et al. | 111/106 |
| 4,042,270 A * | 8/1977 | Weiland | 294/50.8 |
| 4,057,277 A * | 11/1977 | Burkholder | 294/50.8 |
| 4,489,969 A * | 12/1984 | Merry | 294/50.8 |
| 4,694,760 A * | 9/1987 | Camp | 111/92 |
| 4,948,188 A * | 8/1990 | Haslam | 294/54.5 |
| 4,953,347 A * | 9/1990 | Siegfried | 56/400.12 |
| 5,497,714 A * | 3/1996 | Schlotthauer | 111/106 |
| 5,743,579 A * | 4/1998 | Ranburger | 294/50.8 |
| 6,257,346 B1 * | 7/2001 | Schofield et al. | 172/381 |
| 6,273,482 B1 * | 8/2001 | Pickren | 294/50.8 |
| 6,341,568 B1 * | 1/2002 | Culley | 111/117 |
| 6,439,629 B1 * | 8/2002 | Bieth | 294/50.9 |
| 6,941,880 B2 * | 9/2005 | Culley | 111/117 |
| 6,966,269 B2 * | 11/2005 | Sawatzky et al. | 111/100 |
| 7,290,814 B2 * | 11/2007 | Lipscomb et al. | 294/50.8 |
| 7,461,880 B2 * | 12/2008 | Norton et al. | 294/50.8 |
| 2004/0212204 A1 * | 10/2004 | Swartz | 294/50.8 |

* cited by examiner

*Primary Examiner* — Robert Pezzuto
(74) *Attorney, Agent, or Firm* — Howson & Howson LLP

(57) ABSTRACT

Apparatus for providing a six-inch deep trench in a lawn surface, for the primary purpose of installing irrigation pipe for sprinkler systems.
A trenching tool which includes a lower portion having two heavy steel blades and a hinge mechanism. The steel impact blades are sharpened at the bottom to accommodate a V configuration to enhance the downward penetrating action by the operator as he drives the blades into the ground until the desired 6" is reached. The operator then forces the handles together which separates or widens the bottom portion of the channel.
The channel/trench is elongated for any distance the operator desires by repeatedly thrusting the tool into the lawn right next to the elongated section of the original opened trench.

8 Claims, 3 Drawing Sheets

MANUAL TRENCH TOOL

FIELD OF THE INVENTION

The present invention relates to a trenching tool which is manoeuvred by hand into soft soils, for the purpose of installing sprinkler systems, with minimum damage to present lawn surfaces.

BACKGROUND

The lawn sprinkler systems in North America are expected to be one of the growing desires of the aging baby boomers. This growing segment of the populace has a very restricted budget. They also have in most cases, matured homes with established lawns. For these reasons it is predicted that the time is right for the introduction of a light duty manual trenching tool for the trenching part of shallow sprinkler system pipes.

There are very few previous tools offered for this simple trenching operation.

SUMMARY

It is the object of the present invention, therefore, to provide an improved lightweight tool to open the ground temporarily, approximately 6 inches deep for lengths of a normal urban property plot.

In the principle aspect of their invention there is provided a manual trench tool comprising of the following:

(1) two handles (1) and (2) composed of elongated lengths of wall pipe material
two plates (3a and 3b) at the bottom of the assembly which are angle sharpened for maximum penetration
hinges fabricated from strong standard pipe (4) with a bolt (5) supplementing the hinge pin One embodiment of the invention will now be described in conjunction with the drawings in which:

DETAILED DESCRIPTION

Figure 2:
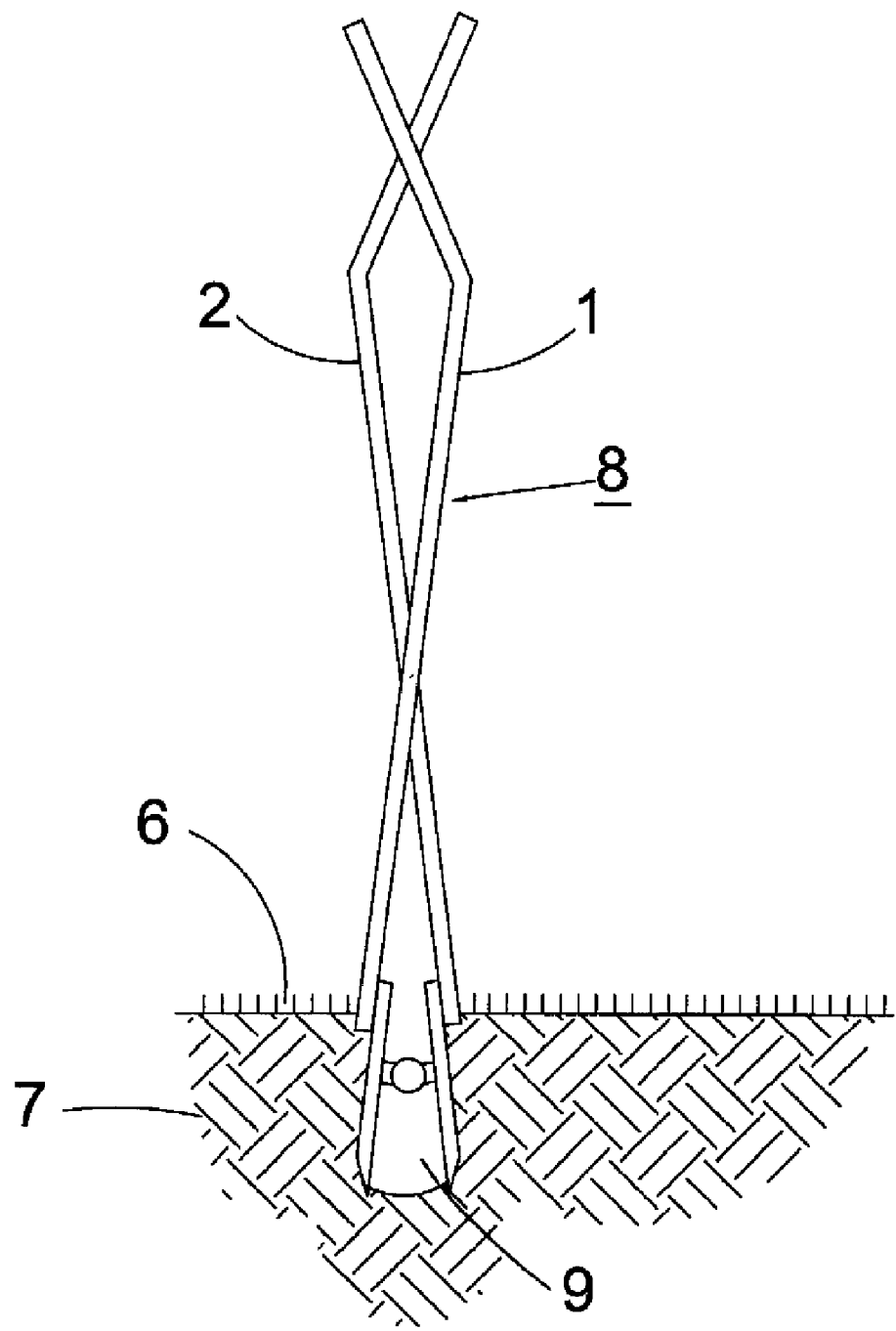
FIG. 2 is a side view showing the tool in the trench widening position.
Figure 3:
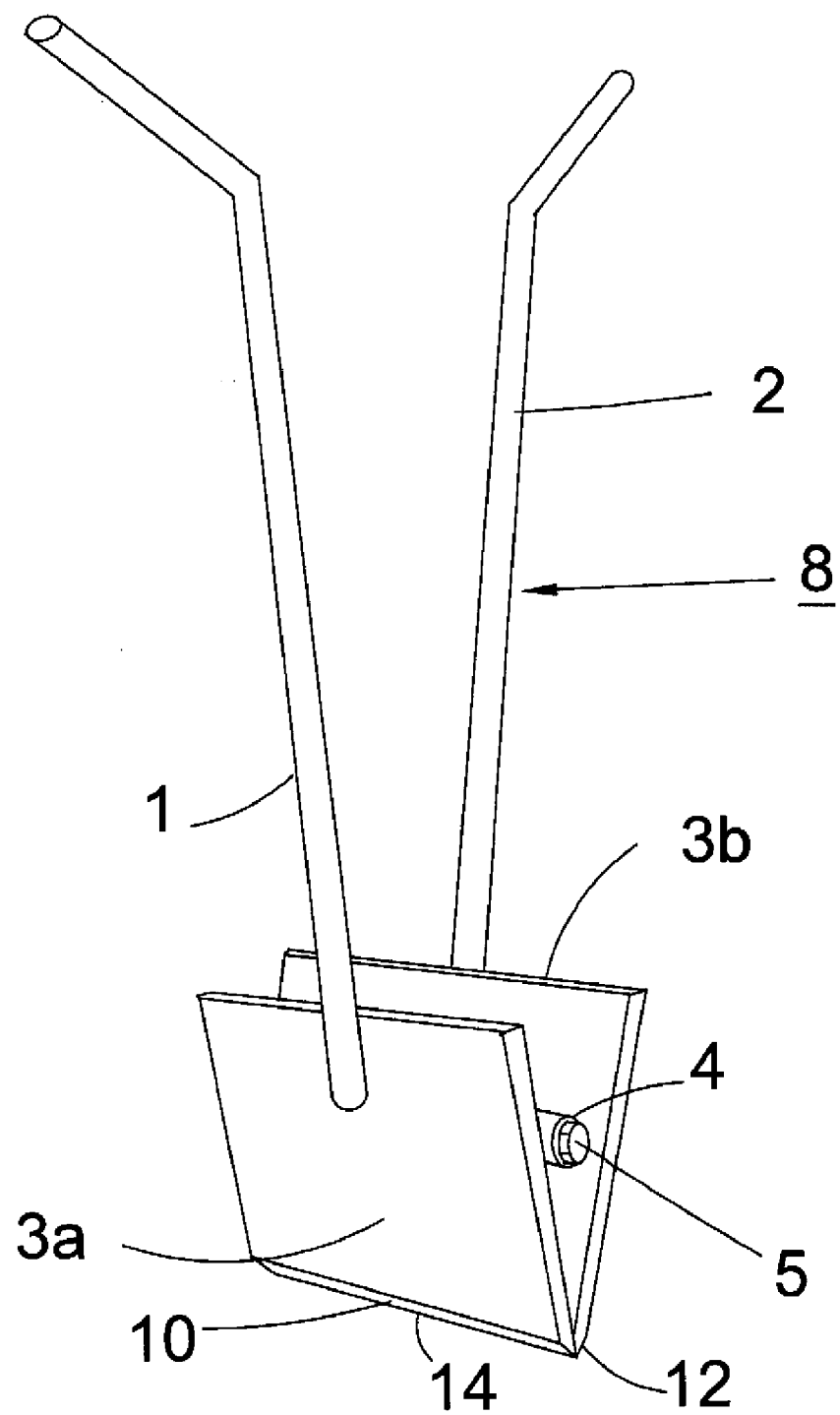
FIG. 3 is the angle view of the Manual Trench Tool.

Referring to the accompanying drawings there is illustrated a manual trench tool, generally indicated by reference numeral (8). As shown in FIG. 2, the tool (8) is particularly useful for providing a temporary trench (9) for inserting shallow lawn sprinkler lines for lawn sprinklers.

The tool (8) is fabricated from various grades of standard steel. The handles (1) and (2) are cut from standard 1"×⅛" wall pipe. The two strike plates (3) at the bottom of the tool are cut to size from W' standard steel plate. A hinge between the plates is cut and fabricated from ¾" pipe (4) and a ⅝" bolt (5). This tool has to be durable enough only to penetrate the lawn surface (6) and the underlying soil (7) to a depth of 6". This process is simplified significantly by the softening of the lawn surface (6) by water before the trench (9) is started.

Figure 1:
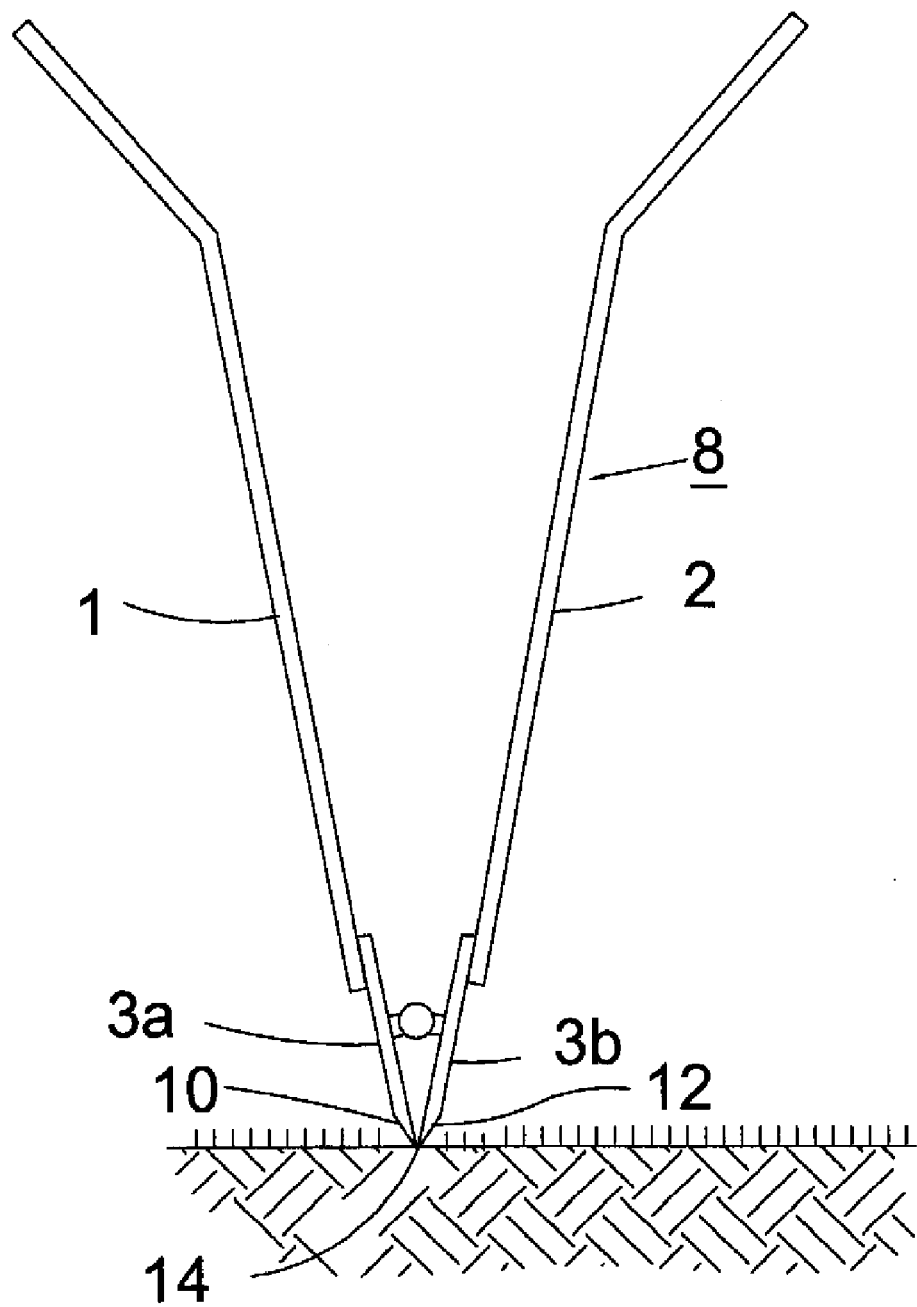
FIG. 1 is a side view of the present Invention showing the thrust position.

The handles (1) and (2) are bent to a desired angle 30 degrees approximately 30% of the distance from the top. The left handle (1) must be bent 30 degrees to the left, whereas the right handle (2) must be bent 30 degrees to the right. These handles are welded to the ¼" steel plates (3a) and (3b) in a manner shown in FIG. 1. The steel strike plates (3a) and (3b) are sharpened to form substantially straight beveled edges 10 and 12 on the outside of the bottom of the plates to allow the two plates to form a single sharp earth-penetrating edge in the shape of a perfect V at the bottom of the tool, also shown in FIG. 1. This allows for ease of penetration in the lawn surface. The hinges, mentioned above, are positioned at approximately the centre of the elongated portion of the steel plates. They are fastened by a welded process. The handles are offset so the manual operator may force the handles together causing a widening of the plates at the bottom. See FIG. 2.

The widening action of the lower portion of the plates forces the lawn materials to open therefore create a six-inch long trench (9) six inches deep. The operator then withdraws the apparatus from the lawn (6) and (7), and therefore returns the handles to the original V configuration. He then thrusts the tool into the lawn again, obviously right next to the original six inches of trench. Through repeated simultaneous actions the operator can create several six-inch deep trenches wherever he wants, in his lawn. Obviously the irrigation pipe gets laid in these trenches to the desired locations for sprinkler heads to be installed later. The trench is filled in by simply pushing down on each side of the lawn edge by the operator's foot.

The apparatus eliminates the need for costly equipment usually required to do this procedure. This apparatus also eliminates the damage done to a lawn's surface by the heavy equipment required.

In general, the invention is constituted by an apparatus tool comprising a 48" long tubular plate steel thrust and pry mechanism encompassing precise bends to accommodate a forceful earth injection process, and a pair of pipe handles welded to the strike plates at the bottom encompassing a fabricated heavy-duty hinge in the middle of the strike plates. The apparatus is intended for prying the ground apart, thus leaving a temporary imprint in a lawn after withdrawal. The lawn injection means can be arranged to create a pipe trench. Specifically, the uniquely designed, swivel action of the strike plates inject and widen the terrain for the desired depth and width of proposed irrigation pipe.

Since various modifications could be made in my invention as herein above described, and many apparently widely different embodiments of same made within the spirit and scope of the claims without department from such spirit and scope, it is intended that all matter contained in the accompanying specification shall be interpreted as illustrated only and not in a limiting sense.

I claim:

1. A manual trenching tool comprising:
   a first elongated, rigid, handle composed of a top portion, a middle portion and a bottom portion, the top portion having an upper end and extending at an angle from the middle portion, said upper end being the uppermost extremity of the first handle;
   a first strike plate rigidly connected to, and extending from, the bottom portion of the first handle;
   a second elongated, rigid, handle composed of a top portion, a middle portion and a bottom portion, the top portion of the second handle also having an upper end and extending at an angle from the middle portion, said upper end of the top portion of the second handle being the uppermost extremity of the second handle; and
   a second strike plate rigidly connected to, and extending from, the bottom portion of the second handle;
   wherein said first and second strike plates have mutually facing surfaces and oppositely facing, substantially planar surfaces, and each of said first and second strike plates has a substantially straight beveled edge;

the trenching tool also including a hinge mechanism, located between the first and second strike plates and connecting the first and second strike plates for relative pivoting movement of the plates, from an earth penetrating position to a trenching position, such that, in the earth penetrating position, with the first and second elongated handles spaced apart, the straight beveled edges of the first and second strike plates abut each other coextensively, thereby forming a single, sharp, straight, earth-penetrating edge, and, in a trenching position, with the first and second elongated handles adjacent each other, the beveled edges of the first and second strike plates are spaced from each other; and wherein the top portions of the handles extend from the middle portions thereof in opposite directions, and to an extent such that manually graspable parts of the top portions remain on opposite sides of an intermediate location between said manually graspable parts as the strike plates are moved from the earth penetrating position to the trenching position.

2. The trenching tool of claim 1, wherein the maximum length of each strike plate, in a direction parallel to its beveled edge is substantially equal to the length of its beveled edge, whereby successive penetrations of a lawn surface, each penetration being followed by said relative pivoting movement of the plates, can form a continuous trench.

3. The trenching tool of claim 1, wherein the top portion of the first elongated handle is a substantially straight portion extending from a bend at which it meets the middle portion of the first elongated handle at an angle of approximately 30 degrees and the top portion of the second elongated handle is a substantially straight portion extending from a bend at which it meets from the middle portion of the second elongated handle at an angle of approximately 30 degrees, and wherein, when said straight beveled edges of the strike plates are in abutment, said top portions extend from said bends in directions such that the top portions diverge from each other, proceeding from said bends toward their upper ends, at an angle greater than the angle formed by said middle portions.

4. The trenching tool of claim 1, wherein the first and second strike plates extend substantially parallel to the bottom and middle portions of the first and second elongated handles respectively.

5. The trenching tool of claim 1, wherein parts of the handles cross each other when the strike plates are in the trenching position.

6. The trenching tool of claim 3, wherein parts of the handles cross each other when the strike plates are in the trenching position.

7. The trenching tool of claim 1, wherein the first and second strike plates extend substantially parallel to the bottom and middle portions of the first and second elongated handles respectively, wherein the hinges are positioned to allow parts of the handles, located between the strike plates and the upper portions of the handles, to cross each other when the strike plates are in the trenching position.

8. The trenching tool of claim 1, wherein each strike plate is substantially rectangular, whereby successive penetrations of a lawn surface, each penetration being followed by said relative pivoting movement of the plates, can form a continuous trench.

* * * * *